W. D. ROBINSON.
PLANT SUPPORT.
APPLICATION FILED FEB. 27, 1917.
1,244,897.
Patented Oct. 30, 1917.
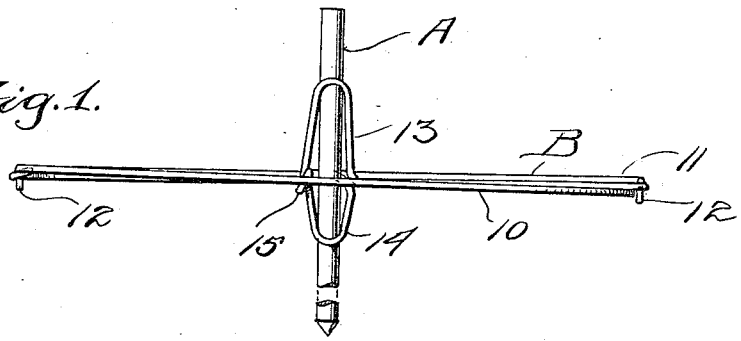
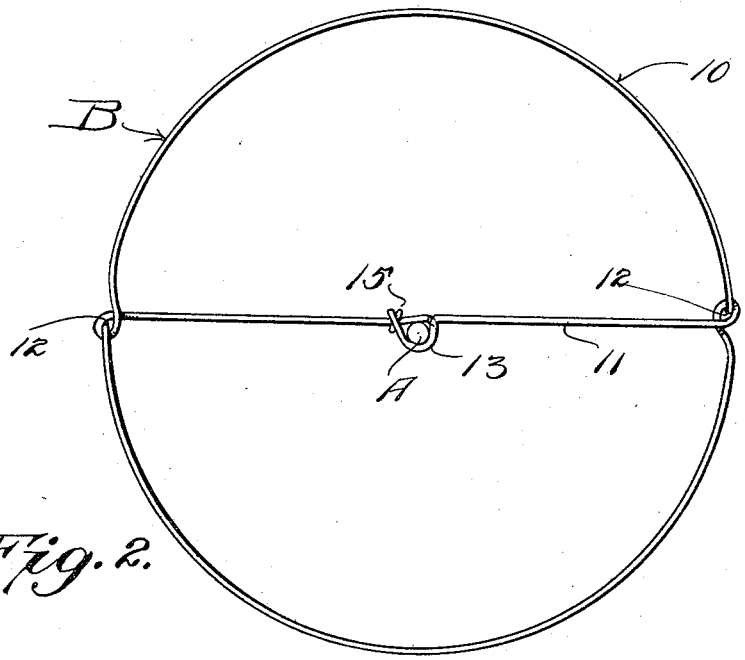
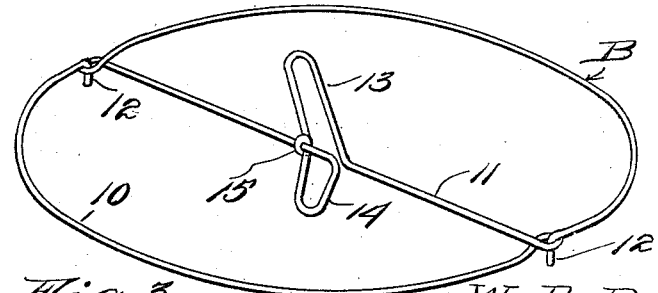
Witness
Inventor
W. D. Robinson
By
Attorneys

UNITED STATES PATENT OFFICE.

WALTER D. ROBINSON, OF MAMARONECK, NEW YORK.

PLANT-SUPPORT.

1,244,897.  Specification of Letters Patent.  Patented Oct. 30, 1917.

Application filed February 27, 1917. Serial No. 151,311.

*To all whom it may concern:*

Be it known that I, WALTER D. ROBINSON, a subject of the King of Great Britain, residing at Mamaroneck, in the county of Westchester, State of New York, have invented certain new and useful Improvements in Plant-Supports; and I do hereby declare the following to be a full, clear, and exact description of the invention, such as will enable others skilled in the art to which it appertains to make and use the same.

This invention relates to improvements in plant protectors, and particularly to protectors for use in greenhouses, in the garden, or in any place where flowers or plants are set to grow.

One object of the present invention is to provide a novel and simple, as well as a cheap device which will effectively hold the plant branches from falling to the ground at the sides of the plant.

Another object is to provide a device of this character which can be readily attached to a stake which is driven into the soil close to or adjacent the plant.

Other objects and advantages will be apparent from the following description when taken in connection with the accompanying drawing.

In the drawing:

Figure 1 is an elevation of my improved plant holder.

Fig. 2 is a top plan view of the device.

Fig. 3 is a perspective view of the wire ring portion removed from the stake.

Referring particularly to the accompanying drawing, A represents the stake and B the wire support or holder mounted thereon, formed of a single piece.

The wire device includes a ring 10 formed by bending the wire into a semi-circular portion, directing one end transversely to form the diameter of the ring, as represented at 11, and continuing this portion into the remaining half of the ring. At the points connecting the portions of the ring and the transverse member, there are formed the eyes into which the downturned ends 12 of the wire are inserted to form the complete ring. The intermediate portion of the transverse member is formed with an upwardly extending loop 13 and a downwardly extending loop 14, said loops being connected by coiling the one side of the two loops around the main portion of the transverse member, as shown at 15. It will be seen that the stake is passed upwardly through the loops between said loops and the adjacent portion of the transverse member, the stake being thus firmly wedged therein, and danger of the holder sliding down the stake effectively prevented, by the gripping engagement of the loops.

It will be understood that the stake is driven into the ground at a point close to the plant, and that the branches of the plant are brought upwardly through the ring at the sides of the transverse member. To facilitate the positioning of the device, the downturned ends of the ring may be disengaged from the eyes and sprung into open position, thereby permitting the branches to be passed into the ring from the sides.

As the plant grows the ring is slipped upwardly on the stake, thereby confining the branches within a prescribed space.

Attention is also called to the fact that the device can readily be attached to a round, square, or other shaped stake, and that the device can be applied to metal or wooden stakes with equal efficiency.

What is claimed is:

A plant support formed from a single length of wire and including a pair of semi-circular members connected by a central transverse bar, the ends of the bar being connected to the ends of the semi-circular members by means of eye portions, the remaining ends of the semi-circular members being formed with hook members for detachable engagement in the eye portions, the intermediate portion of the bar being bent to form an upwardly extending stake gripping loop and a downwardly extending stake gripping loop, a portion of one of the loops being coiled around the adjacent portion of the bar.

In testimony whereof, I affix my signature, in the presence of two witnesses.

WALTER D. ROBINSON.

Witnesses:
ARTHUR R. STANLEY,
CHARLES M. BAXTER.

Copies of this patent may be obtained for five cents each, by addressing the "Commissioner of Patents, Washington, D. C."